(12) United States Patent  (10) Patent No.: US 8,850,317 B2
Chaudhri  (45) Date of Patent: Sep. 30, 2014

(54) WEB BROWSER AUDIO CONTROLS

(75) Inventor: Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1177 days.

(21) Appl. No.: 11/937,416

(22) Filed: Nov. 8, 2007

(65) Prior Publication Data

US 2009/0106657 A1  Apr. 23, 2009

Related U.S. Application Data

(60) Provisional application No. 60/980,702, filed on Oct. 17, 2007.

(51) Int. Cl.
*G06F 3/00* (2006.01)
*G06F 17/00* (2006.01)
*G06F 3/0484* (2013.01)

(52) U.S. Cl.
CPC ................................. *G06F 3/04847* (2013.01)
USPC .............................. 715/716; 715/866; 700/94

(58) Field of Classification Search
USPC ......................................................... 715/716
See application file for complete search history.

(56) References Cited

U.S. PATENT DOCUMENTS

| | | | | |
|---|---|---|---|---|
| 6,005,563 A * | 12/1999 | White et al. | ................... | 715/718 |
| 6,496,205 B1 * | 12/2002 | White et al. | ................... | 715/824 |
| 7,213,079 B2 * | 5/2007 | Narin | ............................ | 709/246 |
| 7,788,597 B1 * | 8/2010 | Mazhar et al. | ................ | 715/810 |
| 7,844,354 B2 * | 11/2010 | Keohane et al. | ................ | 700/94 |
| 8,406,435 B2 * | 3/2013 | Yerrace et al. | ................ | 381/109 |
| 2002/0010723 A1 * | 1/2002 | Nielsen | ........................ | 707/529 |
| 2002/0016830 A1 * | 2/2002 | Nicolai | ........................ | 709/219 |
| 2002/0152255 A1 * | 10/2002 | Smith et al. | ................... | 709/102 |
| 2003/0080872 A1 * | 5/2003 | Gutta et al. | ................ | 340/691.3 |
| 2003/0151621 A1 * | 8/2003 | McEvilly et al. | ............. | 345/744 |
| 2004/0107442 A1 * | 6/2004 | Bayley | ........................... | 725/93 |
| 2006/0113957 A1 * | 6/2006 | Ito et al. | ....................... | 320/114 |
| 2007/0082608 A1 * | 4/2007 | Nam | ............................ | 455/3.06 |
| 2007/0298773 A1 * | 12/2007 | Uematsu et al. | ........... | 455/414.2 |
| 2009/0024927 A1 * | 1/2009 | Schrock et al. | ................ | 715/722 |

OTHER PUBLICATIONS

Towers, Tarin J. Visual QuickStart Guide Dreamweaver 4 for Windows and Macintosh. Peachpit Press. Apr. 5, 2001. pp. 218-223.*

* cited by examiner

*Primary Examiner* — Stephen Alvesteffer
(74) *Attorney, Agent, or Firm* — Fish & Richardson P.C.

(57) ABSTRACT

One or more audio controls are presented in a browser application to allow a user to adjust one or more audio signals (e.g., mute, adjust volume) provided by one or more audio sources (e.g., websites). In some aspects, the browser application remembers the user's audio control settings for audio sources and automatically applies those settings to the audio controls when audio signals from the audio sources are detected.

20 Claims, 4 Drawing Sheets

| URL 302 | Moot 304 | Volume Level 306 |
|---|---|---|
| 121.356.345 | ON | -- |
| 121.326.355 | OFF | 3 |
| 123.326.325 | OFF | 5 |
| 123.322.335 | ON | -- |
| 123.344.335 | OFF | 2 |
| ••• | ••• | ••• |

WEB BROWSER AUDIO CONTROLS

RELATED APPLICATIONS

This application claims priority to U.S. Provisional Patent Application Ser. No. 60/980,702 filed Oct. 17, 2007, and entitled "Web Browser Audio Controls," the contents of which are incorporated herein by reference.

TECHNICAL FIELD

The subject matter of this patent application is generally related to user interfaces.

BACKGROUND

When using a web browser application (e.g., Microsoft Internet Explorer®, Apple Safari®), audio sources (e.g., websites) will often provide audio signals (e.g., music, noises) which may or may not be welcomed by the user. While operating system desktops often provide audio controls (e.g., volume controls), such audio controls adjust all audio signals playing on the host device, including desirable audio signals such as music the user desires to play from their music library while browsing the Web. Accordingly, if desktop audio controls are used, then desirable audio signals, as well as undesirable audio signals, will be adjusted together which may not be the intent of the user.

SUMMARY

One or more audio controls are presented in a browser application to allow a user to adjust one or more audio signals (e.g., mute, adjust volume) provided by one or more audio sources (e.g., websites). In some aspects, the browser application remembers the user's audio control settings for audio sources and automatically applies those settings to the audio controls when audio signals from the audio sources are detected.

DESCRIPTION OF DRAWINGS

FIG. 3 illustrates an example data structure for storing audio control settings associated with audio source identifiers.

DETAILED DESCRIPTION

Example Browser Window Having Audio Controls

Figure 1:
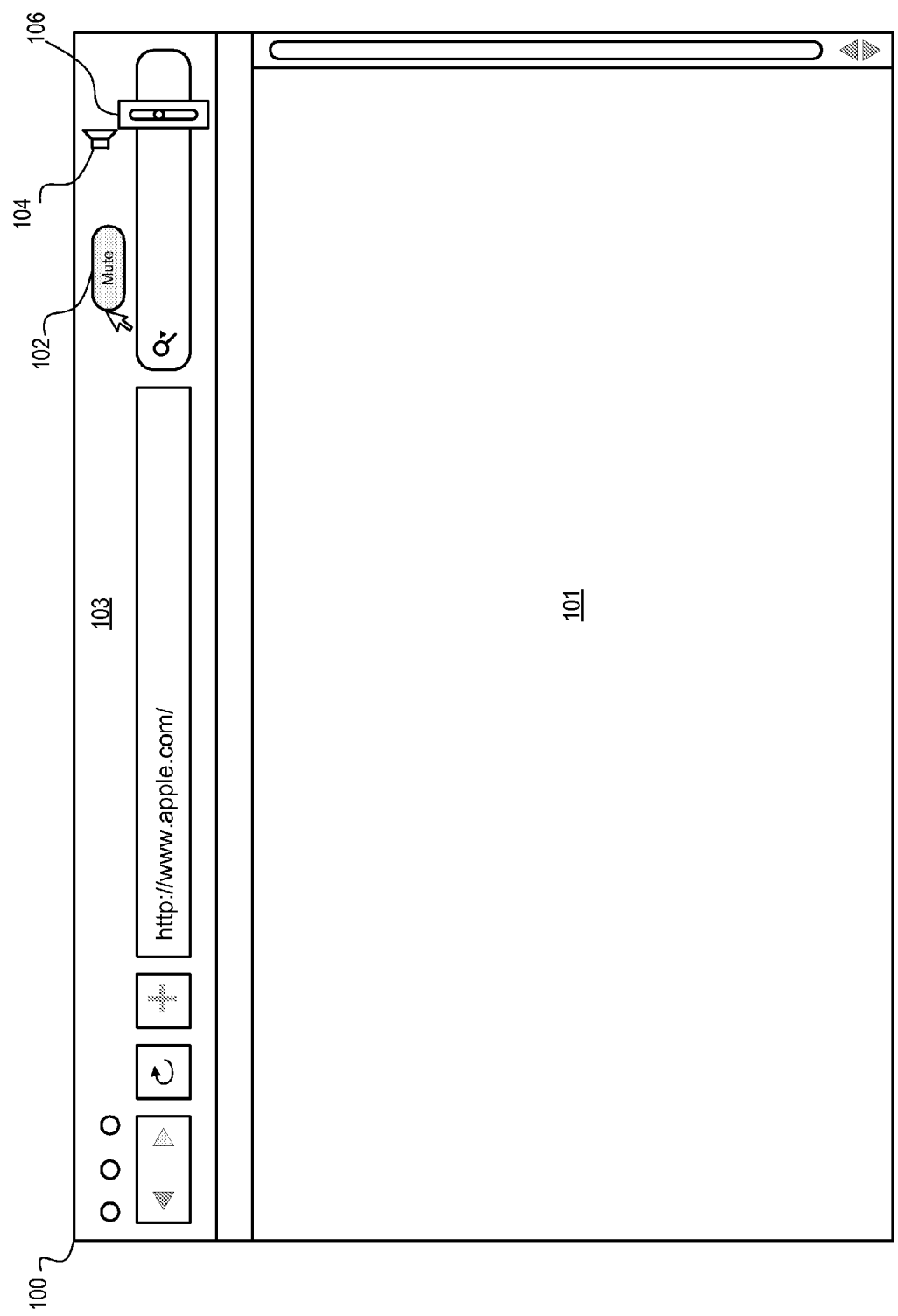
FIG. 1 illustrates an example browser window having audio controls.

FIG. 1 illustrates an example browser application window 100 having audio controls. Generally, the window 100 includes a first portion 101 operable for displaying content and a second portion 103 operable for displaying audio controls. The audio controls are operable for controlling audio signals from audio sources associated with the content, for example.

In the example shown, the browser window 100 includes a mute control 102 (e.g., a toggle button) and a volume control 104. The volume control 104 can include a slider control 106 for adjusting volume level. The browser application can run on any device capable of hosting a browser application, including but not limited to: media players, mobile phones, smart phones, email devices, game consoles or devices, personal computers, personal digital assistants, etc.

In operation, when a user browses an audio source (e.g., a website), various audio signals may be presented in the browser application. These audio signals can be music, advertising jingles, noises, sound effects, speech, etc. Concurrently, the user may be listening to music from the user's personal music library. In some cases, audio signals from audio sources may interfere with the listening enjoyment of the user. In such cases, the user can manipulate the mute or volume controls 102, 104, with a mouse, finger, stylus or other input device, to mute and/or adjust the audio signals (e.g., decrease or increase volume levels).

In some implementations, if a link is selected or moused over in the first portion 101 of the browser window 100, audio signals associated with the link are disabled. For example, an audio engine 418 (FIG. 4) can disable or block one or more audio channels associated with one or more audio sources.

In some implementations, if an audio source is encountered for the first time in a browser application, then audio control settings specified by the user (e.g., activation of the mute toggle button 102) for controlling a audio signal from the audio source can be stored in a data structure (e.g., a database). Once stored, the user specified audio control settings can be recalled and applied to the audio controls 102, 104, when the audio source is encountered in another session by the browser application.

Example Audio Control Process

Figure 2:
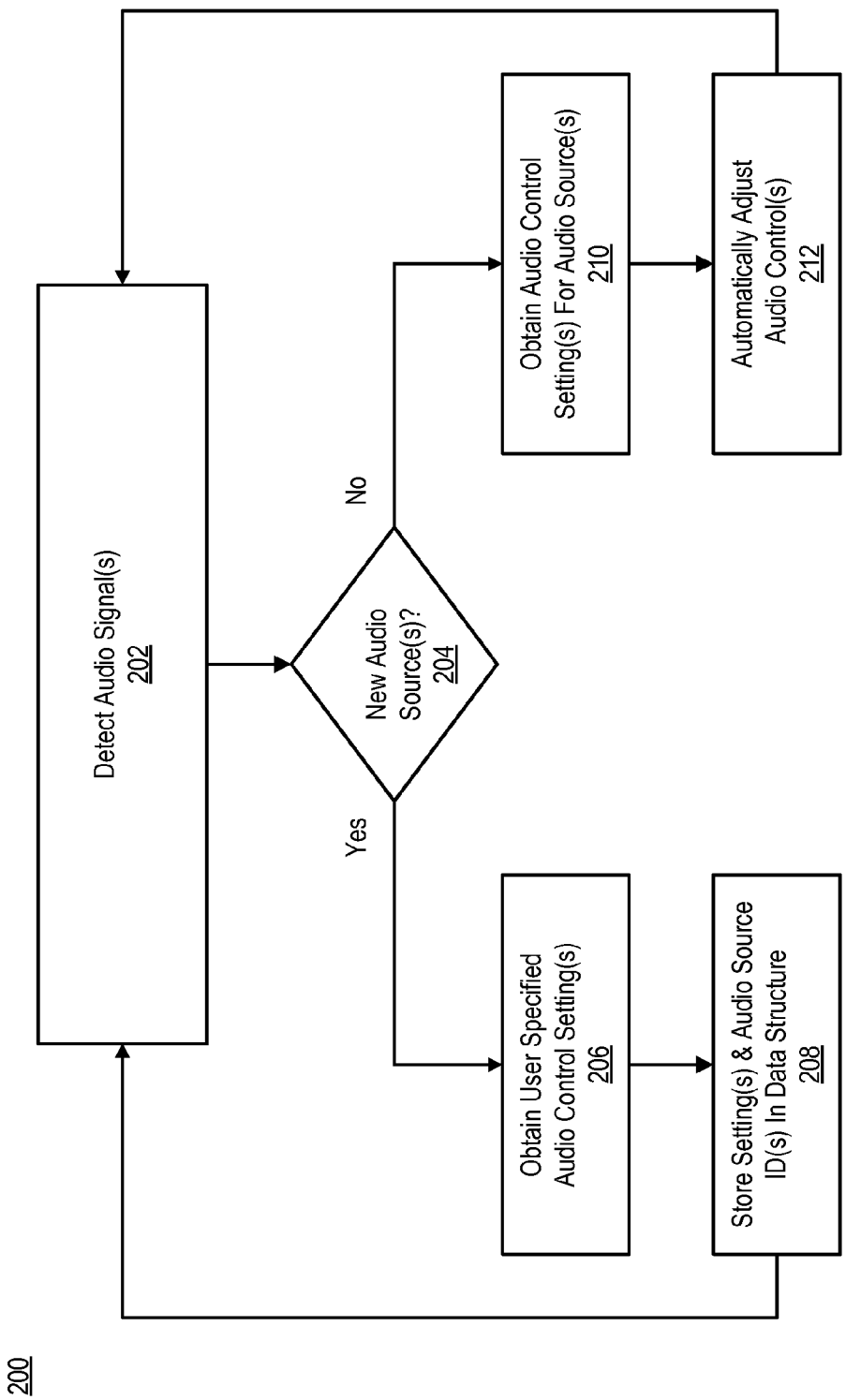
FIG. 2 is a flow diagram of an example process for adjusting audio controls in a browser window.

FIG. 2 is a flow diagram of an example process 200 for adjusting audio controls in a browser window (e.g., window 100). In some implementations, the process 200 begins when one or more audio signals from one or more audio sources are detected (202). The audio signals can be any audio signal (e.g., music, noise, speech, sound effects). The audio sources can be any network resources or web properties (e.g., a website, a music store).

If an audio source was not encountered by the browser application in a previous session (204), then user specified audio control settings for controlling audio signals from the audio source can be obtained (206) and stored in a data structure (208). The user can specify the audio control signals by manipulating one or more audio controls of the browser application. For example, the user could manipulate a mute button (e.g., mute toggle button 102) or a volume slider (e.g., volume slider control 106) to mute an audio signal or adjust the volume of the audio signal, respectively. The state of the mute control or the volume control (e.g., the volume control level) can be stored in the data structure. In some implementations, the audio control settings are stored when the user exits the web site, the user focuses on another window, the user closes the browser or any other user or programmatic trigger events. In some implementations, the audio control settings are stored at regular intervals or on a scheduled basis.

If the audio source was encountered by the browser application in a previous session (204), then previously stored user specified audio control settings are obtained from the data structure (210) and used to automatically adjust the audio controls of the browser application (212). An identifier of the audio source (e.g., a URL, domain name) can also be stored with the audio control settings to simplify retrieval of the audio control settings by the browser application in subsequent sessions.

In some implementations, the user can specify various preferences for audio controls for the browser application. A preference pain or menu can allow the user to select various options for controlling audio signals. For example, the user can specify (e.g., by domain name or URL) one or more audio sources for which the user does not wish to receive audio signals. In some cases, the user can specify that volume levels for audio signals from a specified audio source be automatically adjusted over time until the audio signal become audible to the user. In some implementations, the user can specify that audio signals from a specified audio source be muted or adjusted only if another application is running. For example, the process 200 can determine if a media player is playing music, videos or other content. If a media player is playing music, videos or other content, then the audio controls of the browser application can be enabled. Otherwise, the audio controls of the browser application can be disabled.

In some implementations, user specified audio control settings can be stored in a data structure of a network storage device for downloading by the user on other devices for which audio control is desired.

Example Data Structure For Storing Audio Control Settings

FIG. 3 illustrates an example data structure 300 for storing audio control settings associated with identifiers (e.g., URLs) for audio sources. In the example shown, the data structure 300 includes a column 302 for storing identifiers (e.g., URLs, domain names, unique numbers), a column 304 for storing mute control states and a column 306 for storing volume levels.

In a first example, the first row of the data structure 300 stores web address 121.356.345. For this web address, a moot control of the browser application is "ON" or activated. The "ON" state results in no audio signals being played through the browser application. When the moot control state is "ON", volume control levels are not used.

In a second example, the second row of the data structure 300 stores web address 121.326.355. For this web address, a moot control state of the browser application is "OFF" or deactivated. The "OFF" state results in audio signals being played through the browser application at a volume level indicated in column 306 of the same row. In the example shown, the volume level is set at "3" on a scale of 1-10.

The data structure 300 is an example data structure. Other data structures are possible including data structures having more or fewer audio control settings.

System Architecture

Figure 4:
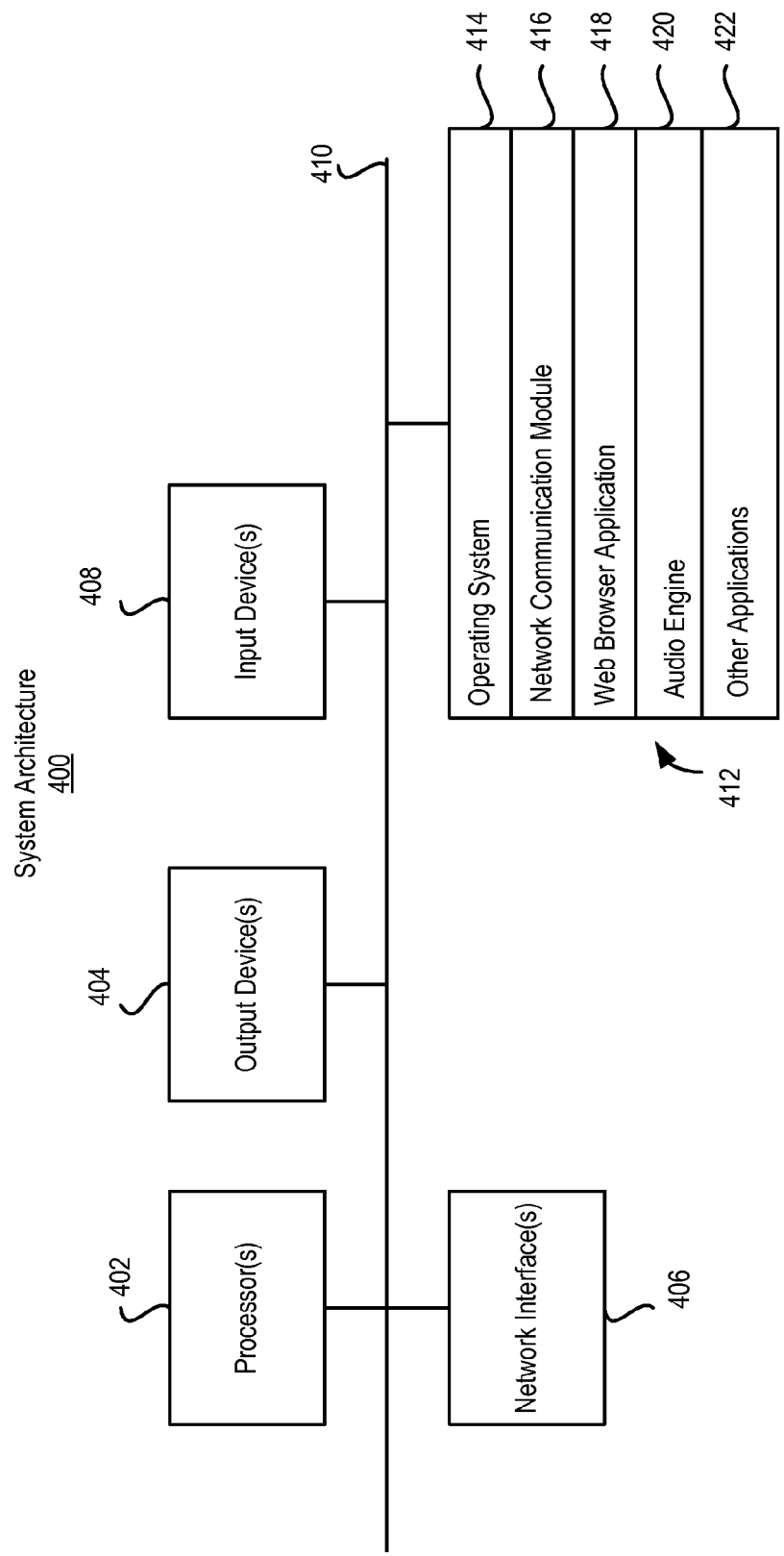
FIG. 4 is a block diagram of a system architecture for implementing the features and operations described in reference to FIGS. 1-3.

FIG. 4 is a block diagram of a system architecture 400 for implementing the features and operations described in reference to FIGS. 1-3. Other architectures are possible, including architectures with more or fewer components. In some implementations, the architecture 400 includes one or more processors 402 (e.g., dual-core Intel® Xeon® Processors), one or more output devices 404 (e.g., LCD), one or more network interfaces 406, one or more input devices 408 (e.g., mouse, keyboard, touch-sensitive display) and one or more computer-readable mediums 412 (e.g., RAM, ROM, SDRAM, hard disk, optical disk, flash memory, etc.). These components can exchange communications and data over one or more communication channels 410 (e.g., buses), which can utilize various hardware and software for facilitating the transfer of data and control signals between components.

The term "computer-readable medium" refers to any medium that participates in providing instructions to a processor 402 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 412 further includes an operating system 414 (e.g., Mac OS® server, Windows® NT server), a network communication module 416, a web browser application 418 (e.g., Microsoft Internet Explorer®, Apple Safari®), an audio engine 420 and one or more other applications 422. The operating system 414 can be multi-user, multiprocessing, multitasking, multithreading, real time, etc. The operating system 414 performs basic tasks, including but not limited to: recognizing input from and providing output to the devices 406, 408; keeping track and managing files and directories on computer-readable mediums 412 (e.g., memory or a storage device); controlling peripheral devices; and managing traffic on the one or more communication channels 410. The network communications module 416 includes various components for establishing and maintaining network connections (e.g., software for implementing communication protocols, such as TCP/IP, HTTP, etc.).

The web browser application 418 presents a browser window, navigation controls and audio controls, such as the audio controls 102, 104, shown in FIG. 1. The audio engine 420 includes various software components and services for receiving and processing audio channels received through the network interfaces 406 or provided locally by a media player or other application 422 (e.g., QuickTime®). An example audio engine 420 is CoreAudio®, included in Mac OS X operating system, developed by Apple Inc. (Cupertino, Calif., USA).

The architecture 400 is one example of a suitable architecture for hosting a browser application having audio controls. Other architectures are possible, which include more or fewer components. The architecture 400 can be included in any device capable of hosting a web browser, including but not limited to: media players, mobile phones, smart phones, email devices, game consoles or devices, personal computers, personal digital assistants, etc. The architecture 400 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
in a web browser application having one or more audio controls, the web browser application running on a computing device:
detecting an audio signal from a website;
determining an identifier for the website;
comparing the website identifier to a plurality of website identifiers having corresponding user-specified audio control settings stored on the computing device;
based on the comparison, determining that user-specified audio control settings for the website are stored on the computing device; and
automatically adjusting the one or more audio controls using the stored user-specified audio control settings for the website.

2. The method of claim 1, further comprising:
obtaining input specifying one or more audio control settings for the website; and
storing a mapping of the specified audio control settings to the website identifier.

3. The method claim 1, where determining if audio control settings exist for the one or more audio controls further comprises:
searching a data structure for the audio control settings using the website identifier.

4. The method of claim 1, where automatically adjusting one or more audio controls includes activating or manipulating a mute control or a volume control.

5. The method of claim 4, further comprising:
automatically adjusting a volume control so that the audio signal being adjusted gradually becomes audible.

6. A method comprising:
displaying a graphical user interface for a web browser application on a display of a computing device, the graphical user interface displaying one or more graphical audio controls of the web browser application:
detecting an audio signal from a website displayed in the graphical user interface;
obtaining an identifier for the website;
obtaining, by the computing device, user input to at least one of the graphical audio controls specifying an audio control setting; and
storing, at the computing device, the user specified audio control setting and the website identifier in a data structure, where the data structure maps a plurality of website identifiers to corresponding user-specified audio control settings.

7. The method of claim 6, further comprising:
adjusting at least one audio control based on the user specified audio control settings.

8. The method of claim 7, further comprising:
adjusting a volume control so that the audio signal gradually becomes audible.

9. A non-transitory computer-readable medium having instructions stored thereon, which, when executed by a computing device, causes the computing device to perform operations comprising:
generating a window of a web browser application having a first portion for presenting content and a second portion for presenting an audio control of the web browser application;
detecting an audio signal from a website associated with the content;
determining an identifier for the website;
comparing the website identifier to a plurality of website identifiers having corresponding user-specified audio control settings stored on the computing device;
based on the comparison, determining that user-specified audio control settings are stored on the computing device; and
automatically adjusting the audio control based on the stored user-specified audio control settings.

10. The non-transitory computer-readable medium of claim 9, further comprising:
obtaining input specifying an audio control setting and an identifier for the website; and
storing the specified audio control setting and the website identifier.

11. The non-transitory computer-readable medium of claim 9, further comprising:

searching a data structure that maps audio control settings to website identifiers for the audio control setting associated with the website identifier.

12. The non-transitory computer-readable medium of claim 9, where automatically adjusting the audio control includes activating or manipulating a mute control or a volume control.

13. The non-transitory computer-readable medium of claim 12, further comprising:

automatically adjusting a volume control so that the audio signal being adjusted gradually becomes audible.

14. A non-transitory computer-readable medium having instructions stored thereon, which, when executed by a computing device, causes the computing device to perform operations comprising:

generating a web browser application window having a first portion for presenting content and a second portion for presenting an audio control of the web browser application;

detecting an audio signal from a website associated with the content;

obtaining an identifier for the website;

obtaining user input to the audio control that specifies an audio control setting; and storing the user specified audio control setting and the website identifier in a data structure, where the data structure maps a plurality of website identifiers to corresponding user-specified audio control settings.

15. The non-transitory computer-readable medium of claim 14, further comprising:

adjusting the audio control based on the user specified audio control setting.

16. A system comprising:

a processor; and a memory coupled the processor and operable for storing instructions, which, when executed by the processor, causes the processor to perform operations comprising:

generating a window of a web browser application having a first portion for presenting content and a second portion for presenting an audio control of the web browser application;

detecting an audio signal from a website associated with the content;

determining an identifier associated with the website;

comparing the website identifier to a plurality of website identifiers having corresponding user-specified audio control settings stored on the system;

based on the comparison, determining that user-specified audio control settings for the website are stored on the system; and automatically adjusting the audio control using the stored user-specified audio control settings associated with the website.

17. The system of claim 16, further comprising:

obtaining input specifying an audio control setting and an identifier for the website; and storing the specified audio control setting in association with the website identifier.

18. The system of claim 16, further comprising:

searching a data structure for the audio control setting using the website identifier.

19. The system of claim 16, where automatically adjusting the audio control includes activating or manipulating a mute control or a volume control.

20. The system of claim 19, where the mute control is a toggle button.

\* \* \* \* \*